(12) United States Patent
    Thomas

(10) Patent No.: US 8,294,565 B1
(45) Date of Patent: Oct. 23, 2012

(54) AUTOMATIC TURN SIGNAL MONITOR AND WARNING

(76) Inventor: Charles D. Thomas, Tulsa, OK (US)

( * ) Notice: Subject to any disclaimer, the term of this patent is extended or adjusted under 35 U.S.C. 154(b) by 506 days.

(21) Appl. No.: 12/611,513

(22) Filed: Nov. 3, 2009

(51) Int. Cl.
    *B60Q 1/52* (2006.01)
(52) U.S. Cl. ....................................... 340/472
(58) Field of Classification Search .............. 340/472, 340/457, 475, 477, 438; 307/141
    See application file for complete search history.

(56) References Cited

U.S. PATENT DOCUMENTS

| | | | |
|---|---|---|---|
| 3,806,868 A | 4/1974 | Portman | |
| 3,931,529 A | 1/1976 | Williamson, Jr. | |
| 3,964,019 A * | 6/1976 | Wethe et al. | 340/457 |
| 4,907,844 A * | 3/1990 | White | 340/457 |
| 4,933,665 A * | 6/1990 | Bull et al. | 340/457 |
| 5,264,827 A * | 11/1993 | Giovanni | 340/477 |
| 5,414,407 A * | 5/1995 | Gerrans et al. | 340/475 |
| 5,523,738 A * | 6/1996 | Fuller | 340/475 |
| 5,790,017 A * | 8/1998 | Berryhill | 340/475 |
| 5,801,622 A | 9/1998 | Chunick | |
| 6,068,339 A | 5/2000 | Linzalone | |
| 6,236,306 B1 | 5/2001 | Liebelt | |
| 6,529,126 B1 | 3/2003 | Henry | |
| 6,686,837 B2 | 2/2004 | Kim | |
| 2006/0044130 A1 * | 3/2006 | Danowski | 340/475 |
| 2006/0164226 A1 * | 7/2006 | Hartle | 340/457 |

* cited by examiner

*Primary Examiner* — Phung Nguyen
(74) *Attorney, Agent, or Firm* — Molly D. McKay

(57) ABSTRACT

An automatic turn signal monitor and warning device for use with a vehicle such as a motorcycle which requires manual deactivation of the turn signals. The device monitors turn signal activation which initiates a timer, and the timer activates a warning signal to remind the operator to deactivate the turn signal when the turn signal remains activated beyond an adjustable time interval after initiation. The warning signal can be produced by one or more audible, visual, or tactile mechanisms. The vehicle's hazard lights do not activate the device's timer, and the device's timer resets when the vehicle's brakes are applied. The device can be retrofitted onto an existing vehicle or included as original equipment when a vehicle is manufactured.

7 Claims, 2 Drawing Sheets

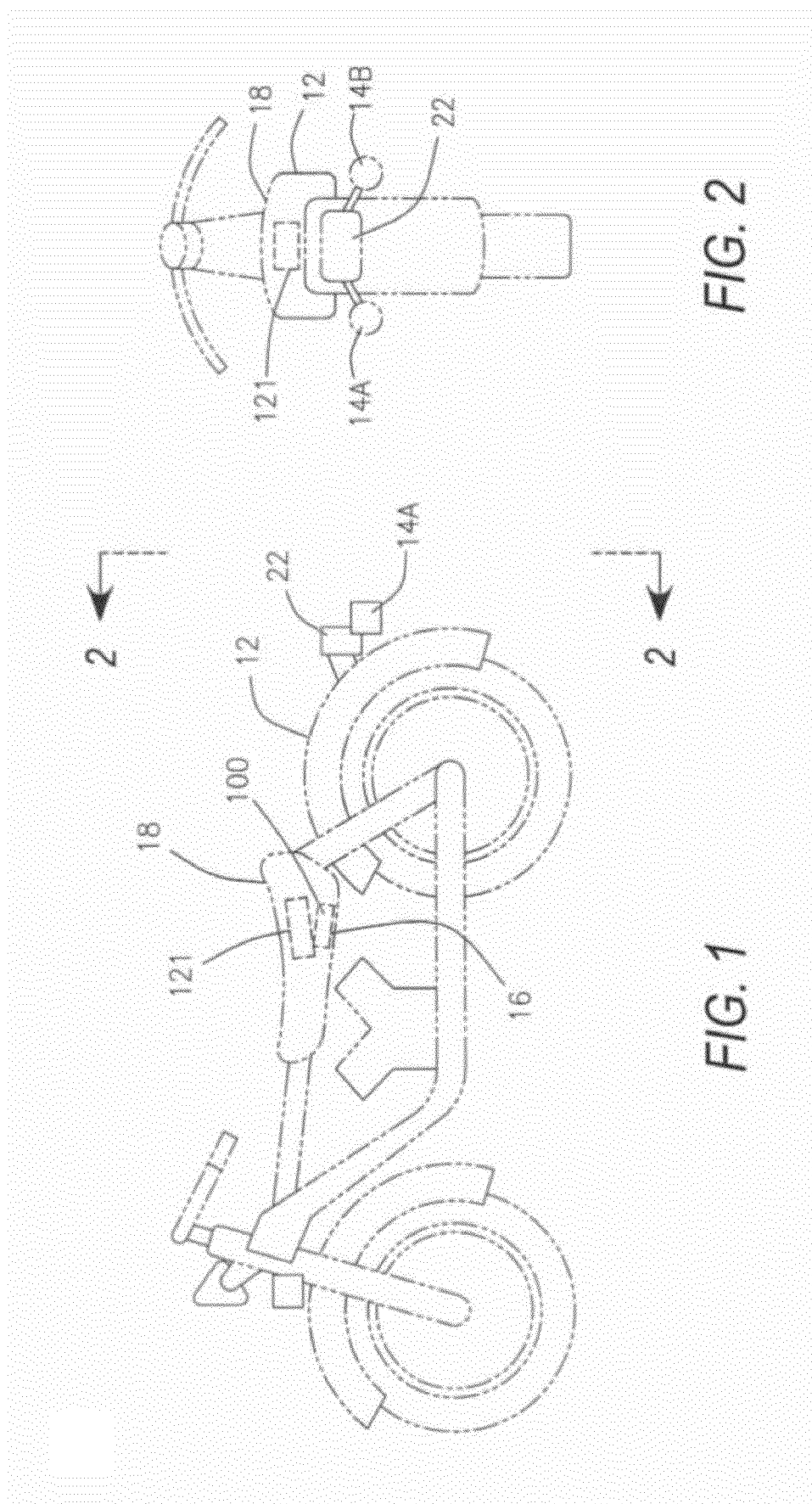

AUTOMATIC TURN SIGNAL MONITOR AND WARNING

BACKGROUND OF THE INVENTION

1. Field of the Invention

The present invention relates to an automatic turn signal monitor and warning device for a vehicle such as a motorcycle which requires manual deactivation of the turn signals by the operator after executing a turn with the vehicle. The device monitors turn signal activation which initiates a timer. The timer activates a warning signal to alert the operator when the turn signal remains activated beyond an adjustable time interval after initiation and to remind the operator to deactivate the turn signal. The vehicle's hazard lights do not activate the device's timer, and the device's timer resets when the vehicle's brakes are applied. The present invention uses digital logic chips to detect turn signal condition and provide a warning to operator. The invention is robust, effective and efficient. The invention has superior electrical isolation to prevent damage to or interfere with the vehicle's systems and is impervious to hazard light operation.

2. Description of the Related Art

The means for disengaging or deactivation turn signals on two wheel vehicles, such as motor cycles, is different than for four wheel vehicles, such as automobiles, because of the differences in the steering mechanisms of the two and four wheel vehicles and how those steering mechanisms function to turn the vehicles. With a four wheel vehicle, the turn is accomplished by physically rotating the steering mechanism, generally a steering wheel, which must return to the center position after the turn is completed. This rotation and return of the wheel to the center position is an easily detected action and an automatic deactivation mechanism can easily be crafted to detect this action and thereby be employed to automatically deactivate the turn signals of the four wheel vehicle after the turn is executed.

However with a two wheel machine, a turn is executed mainly by shifting weight and balance. This action involves a much less distinct movement of the handle bars than the action involves with the wheel of an automobile. Thus, it is difficult to create a device for detecting when a two wheel vehicle has executed a turn and thereby automatically turn off the turn signals on the two wheel vehicle.

Only a few motorcycles have turn signals that automatically switch off after executing a turn, but the majority of motorcycles are not so equipped. The present invention is a useful addition for those motorcycles that do not automatically switch off the turn signals.

On occasion, an operator will fail to manually switch off his turn signal after making a turn. Failure to switch off the turn signal creates a hazardous situation. The function of a turn signal system is to visually broadcast the intention of the vehicle operator. The operators of other vehicles make decisions that can be based on this broadcast information. They may, for instance, proceed into the path of an oncoming vehicle if they believe that the other vehicle is preparing to turn when, in fact, it is not preparing to turn. This miscommunication of intentions can result in a collision.

The present invention addresses this problem by providing an automatic reminder in the form of a warning alarm to the operator to turn off his turn signal when the turn signal remains activated beyond an adjustable time interval after initial activation. The time interval is adjustable to allow the operator sufficient time to complete the turn and turn off the turn signal before the device activates the warning alarm mechanism.

The present invention is an electrical device that is connected to each signal conductor, the battery power, and the chassis ground of the vehicle. The components are resistors, capacitors, diodes, transistors, warning buzzer, logic chips, 12 volt D.C. motor, connectors, fasteners, wiring, etc. as will be more fully described hereafter.

The device has a detector circuit which detects when one of the turn signals is activated and activates a timer in response to the activation of the turn signal. If the turn signal is still on when the preselected time expires on the timer, the voltage pulse is switched to the high impedance input of a MOSFET which is a power amplifier. The load or warning mechanism is powered in concert with the turn signal pulses using the pulses from the turn signal only as a control voltage. There is very little load requirement on the circuit of the vehicle turn signal system. Power for the transducer is provided from the battery through the drain and source connection of the MOSFET. The battery connection is fused.

The invention does not alter the performance of the vehicle systems other than providing the intended warning that that the turn signal is still activated and needs to be turned off. The warning is manifested by a piezo electric buzzer and/or a silent alarm. The silent alarm mechanism might be an unbalanced motor mounted under the seat of the vehicle to provide a tactile indicator to the operator sitting on the seat. The unbalanced motor creates a vibration in the seat that is felt by the operator.

The invention uses digital logic chips to detect turn signal condition and provide warning to operator. This allows the invention to be robust, effective and efficient. Also, the invention is provided with superior electrical isolation to prevent damage to or interference with the vehicle's systems, and it is impervious to hazard light operation.

SUMMARY OF THE INVENTION

The present invention is an automatic turn signal monitor and warning device for a vehicle, such as a motorcycle, which requires manual deactivation of the turn signals by the operator after executing a turn with the vehicle. The device signals the operator via a warning alarm mechanism to turn off his turn signal when the turn signal remains activated beyond an adjustable time interval after initial activation of the turn signal.

The device monitors the right and left turn signals and detects when only one turn signal is activated. The device does not detect when both turn signals are activated which occurs when the hazard lights are turned on. When the device detects that only one turn signal is activated, this activates a timer switching circuit provided in the device which in turn activates a delay timer having an adjustable time interval. If the time expires and the turn signal is still on, the timer allows an electrical signal to reach a transducer or warning alarm mechanism which produces an audible tone or vibration. The transducer is adjustable in intensity to allow the operator to control the intensity of the vibration or level of sound produced by the transducer. The device monitors the vehicle's brake light and resets the device's timer whenever the brake is engaged, as indicated by operation of the brake light.

The invention is provided with digital logic chips to detect turn signal condition and provide warning to operator, thereby producing a device that is robust, effective and efficient. The invention is also provided with superior electrical isolation to prevent damage to or interference with the vehicle's systems, and it is impervious to hazard light operation.

BRIEF DESCRIPTION OF THE DRAWINGS

FIG. 1 is a side view of a motorcycle equipped with an automatic turn signal monitor and warning device that is constructed in according to a preferred embodiment of the present invention.

FIG. 2 is rear view of the motorcycle of FIG. 1 taken along line 2-2 of FIG. 1.

DETAILED DESCRIPTION OF THE PREFERRED EMBODIMENT

Figure 3:
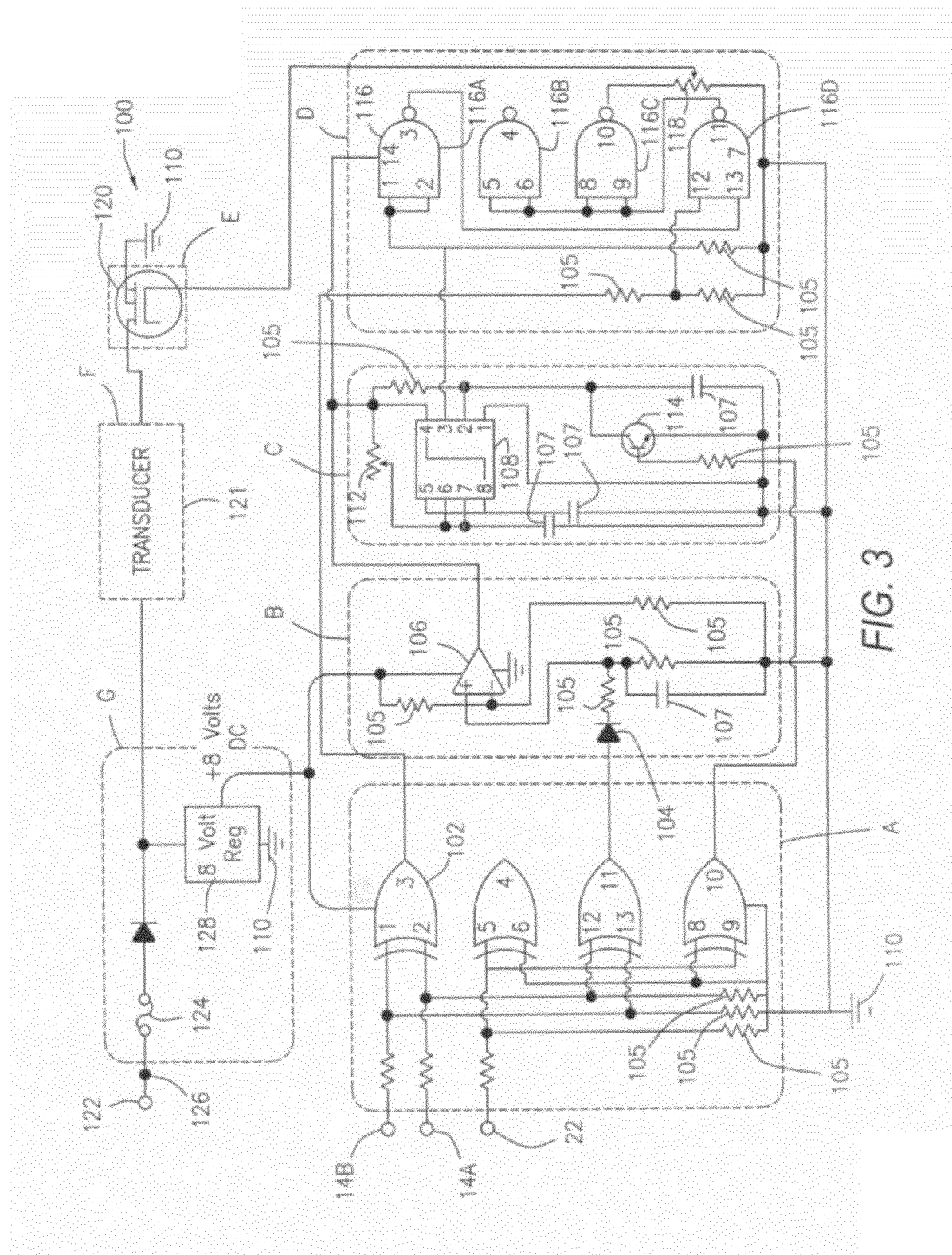
FIG. 3 is an electrical diagram of a preferred embodiment automatic turn signal monitor and warning device.

Referring now to the drawings and initially to FIGS. 1 and 2, there is illustrated a preferred embodiment of an automatic turn signal monitor and warning device 100 for a vehicle 12, such as the motorcycle illustrated in the drawings, which requires manual deactivation of the turn signals 14A and 14B by the operator after executing a turn with the vehicle 12. The device 100 can be either installed as original equipment on a vehicle 12 or retrofitted onto an already existing vehicle 12. For purposes of illustration, the accompanying drawings illustrate a vehicle 12 onto which the device 100 has been installed after the vehicle 12 was manufactured.

FIG. 1 shows a main box 16 of the device 100 that contains most of the electronics for the device 100. The main box 16 is attached to the vehicle 12 in an inconspicuous place such as under the seat 18 of the vehicle 12, as shown in FIG. 1.

Both FIGS. 1 and 2 also include a box representing a warning mechanism 121 which is shown in the illustrations as located under or in the seat 18 of the vehicle 12 immediately above the main box 16. As will be described more fully hereafter, the warning mechanism 121 provides the operator with a warning alarm when one of the turn signals 14A or 14B remains activated beyond an adjustable time interval after initial activation of the turn signal 14A or 14B as a means of reminding the operator to manually turn off the turn signal 14A or 14B.

FIG. 3 is an electrical diagram of the device 100. The electronics are powered by a 12 volt DC power source (not illustrated), such as the one supplying power to the vehicle 12. The chassis of the vehicle 12 serves as ground 110 for the device 100. As illustrated in FIG. 3, in order for the device 100 to provide the operator with a warning alarm, the device 100 is electrically connected to and monitors the left and right turn signals 14A and 14B so that it can identify when only one of the turn signals 14A or 14B is activated, but not when both turn signals 14A and 14B are activated. Both of the turn signals 14A and 14B are activated together only when the vehicle's hazard lights are activated. Upon activation of only one turn signal 14A or 14B, the device 100 activates a delay timer chip 108 having an adjustable time interval. If after the time interval expires and the turn signal 14A or 14B is still on, the timer 108 allows an electrical signal to reach one or more warning mechanisms 121 in the form of transducers which produces an audible tone or vibration as a warning alarm or signal to the operator of the vehicle 12 that his turn signal 14A or 14B is still on. Each transducer 121 is adjustable in intensity to allow the operator to control the intensity of the vibration or the level of sound produced by the transducer 121. The device 100 is also electrically connected to and monitors the vehicle's brake light 22 and resets the device's timer 108 whenever the vehicle's brake is engaged, as indicated by operation of the brake light 22.

Referring now to FIG. 3, the electrical diagram will be described in relationship to the vehicle 12 illustrated in FIGS. 1 and 2. The electrical diagram can be broken down into several major components or circuits that function together to allow the device 100 to function. These various major components or circuits are shown enclosed within broken line boxes associated with the letters A, B, C, D, E, F, and G in FIG. 3. The device 100 uses digital logic chips to detect turn signal condition and provide warning to an operator. This device is robust, effective, and efficient. It also has superior electrical isolation to prevent damage to or interference with the vehicle's electrical systems, and it is impervious to hazard light operation.

Specifically those major components or circuits and their associated boxes are as follows. Box A is the signal sensor or signal input circuit. Box B is pulse detector and timer control. Box C is a timer 555 with brake reset. Box D is the output control. Box E is the power amplifier. Box F is the transducer. Box G is the power supply. Each component will be briefly described below.

Box A is the signal sensor or signal input circuit. The signal sensor of Box A functions to sense activity of turn signals 14A or 14B and brake application 22 and sends a pulse to the output control of Box D and a pulse to the pulse detector of Box B. When the vehicle brakes 22 are applied, a voltage is sent to the timer in Box C which resets the timer circuit. The components appearing in Box A are #4070 quad exclusive OR gate 14 pin dip chip 102 and several 10 kΩ resistors for signal connections.

The inputs to the signal sensor or signal input circuit of Box A are left and right turn signals 14A and 14B, brake lights 22, and DC power from the 8 volt power supply of Box G. The outputs from the signal sensor or signal input circuit of Box A are turn pulse to the output control of Box D, turn pulse to the pulse detector and timer control of Box B, and brake light voltage to the timer and brake reset of Box C.

The quad x-or gate 14 pin dip chip 102 has four X-OR gates, two of which are used for turn signals and one for brake sensing. In the case of the turn signals, the output is a pulse in the image of the input signal when it is present on only one gate of the X-OR gate. If both inputs are pulsed simultaneously, as when hazard lights are operating, no output occurs. One output is connected to the pulse detector which controls the timer. The other is connected to the output control stage Box D. The remaining x-or gate of Box 1 uses the vehicle brake light 22 as input and produces a DC voltage out while the brake 22 is applied. The output is connected to the timer circuit and serves to kill and reset the timer when the brakes 22 are applied.

Box B is pulse detector and timer control. The input for this component is a pulse from the signal sensor of Box A. The inputs for this component are positive 8 volts from the 8 volt regulator, ground, and a pulse from Box A. The output from this component is positive 8 volt DC from the OP-AMP. The subcomponents contained in this major component are diode 104, resistor and capacitor networks and OP-AMP 106. The function of this component is to convert the pulse input from Box A into a positive DC level which powers and operates the timer of Box C and output control stage Box D. This component uses a diode 104, associated resistors 105 and capacitor 107 and an OP-AMP 106. When the pulse from Box A is present at the anode side of the diode of Box B, the diode conducts causing current to flow through the two resistors and charging the capacitor and applying a positive voltage to the non-inverting input of the OP-AMP. This turns the OP-AMP on which applies positive 8 volts to the timer circuit Box C and the output circuit Box D. This positive 8 volts is present while the turn signals are active and it returns to zero when the turn signal is off.

Box C is a timer 555 with brake reset. The input connections for this component are a positive 8 volts from Box B, ground 110, and a reset signal from Box A. The output connection for this component is at pin #3 of the timer chip and connects to the output control Box D. The inputs for this component are positive DC from the pulse detector and timer control of Box B and positive DC from the signal sensor of Box A for reset when the brake is applied. This component uses a 555 timer chip 8 pin dip 108, potentiometer 112, two fixed resistors 105, three capacitors 107 for controlling the delay period and an NPN bi-polar transistor 114 to reset the timer. The component of Box C functions when the turn signal is active and a DC voltage is sent to the output control to prohibit output until delay time has elapsed. The Box C component functions when the turn signal is on by having the timer send a control voltage to Box D during the delay period. The timer chip 108 has no voltage applied unless or until Box A has sensed that a turn signal 14A or 14B is on which causes Box B to send a positive 8 volts to power the timer. When the positive 8 volts is applied to the timer, the capacitor from pin 2 to ground 110 causes a delay in the voltage developed on pin 2. This is interpreted to be a trigger by the 555 chip 108 which then starts a delay period. The length of the delay time is controlled by the variable resistor 112 and capacitor 107 connected to pin 6 and 7 of the 555 chip. The NPN transistor connected to pin 2 of the 555 chip 107 does not conduct until a voltage is applied to the base circuit from Box A, i.e. when the brakes 22 are applied. When the brakes 22 are applied, the voltage from Box A applied to the base circuit of the transistor 114 which conducts and drops the collector voltage to zero. This is interpreted as a reset command by the 555 chip 108 which resets the timer and restarts the delay period.

Box D is the output control. This component is connected to ground 110 and has input connections of positive 8 volts from Box B, a positive pulse from Box A and a control voltage from Box C. This component also has an output connection to provide a pulse to the power amplifier of Box E. The subcomponents of this component are a quad NAND gate 116 having four gates 116A, 116B, 116C and 116C, one potentiometer, and 2 fixed resistors 105. This component functions to provide the drive pulse to the power amplifier of Box E. The output control operating theory is that a NAND gate 116A, 116B, 116C or 116D has an output only when neither input voltage is present. When the inputs are connected together, the gates 116A, 116B, and 116C act as inverters. When a turn signal is turned on, a pulse from Box A is applied to pin 12 of the NAND gate 116D in Box D and a positive 8 volt DC is applied to pins 1 and 2 of NAND gate 116A of Box D. Because pins 1 and 2 are connected together, this gate 116A acts as a simple inverter, thus voltage into the gate 116A will result in no voltage out at pin 3.

The bottom gate 116D has the zero voltage from pin 3 connected to pin 13 and the pulse from Box 1 connected to pin 12. Pin 11 of this bottom gate 116D can only be zero while both pins 12 and 13 have a positive voltage applied. If the turn signal 14A or 14B remains on after the upper gate 116A now has a positive voltage on pin 3, the lower gate 116D has a positive voltage on pin 13 and a pulse on pin 12 producing an inverted pulse on pin 11. Gate 116C re-inverts the pulse and applies it to a variable resistor as a pulse output to Box E.

Box E is the power amplifier. The drain of this component connects to the transducer F, the gate receives the pulse from Box D, and the source connects to ground 110. This component is a MOS FET power transistor 120. MOS FET is short for metal oxide field effect transistor. This component functions to convert voltage pulse on the gate 116 to pulsed current to drive the transducer F.

Box F is the transducer 121 which can be a buzzer, siren or other similar item or items.

Box G is the power supply which provides power to the system. The vehicle's battery 122 and alternator 126 power the device 100 via the device's power supply which includes a fuse 124, a voltage regulator 128, and a diode 130.

While the invention has been described with a certain degree of particularity, it is manifest that many changes may be made in the details of construction and the arrangement of components without departing from the spirit and scope of this disclosure. It is understood that the invention is not limited to the embodiments set forth herein for the purposes of exemplification, but is to be limited only by the scope of the attached claim or claims, including the full range of equivalency to which each element thereof is entitled.

What is claimed is:

1. An automatic turn signal monitor and warning device comprising:
   a signal sensor circuit, a pulse detector and timer control circuit, a timer with brake reset circuit, an output control circuit, a power amplifier circuit, a transducer circuit, and a power supply circuit,
   said sensor circuit further comprises a quad x-or gate 14 pin dip chip wherein said quad x-or gate 14 pin dip chip receives inputs from the turn signals and brake lights of the vehicle and responds to the inputs by sending pulses to the output control circuit, to the pulse detector circuit, and to the timer circuit.

2. An automatic turn signal monitor and warning device comprising:
   a signal sensor circuit, a pulse detector and timer control circuit, a timer with brake reset circuit, an output control circuit, a power amplifier circuit, a transducer circuit, and a power supply circuit,
   a quad x-or gate 14 pin dip chip wherein said quad x-or gate 14 pin dip chip receives inputs from the turn signals and brake lights of the vehicle and responds to the inputs by sending pulses to the output control circuit, to the pulse detector circuit, and to the timer circuit, and
   said pulse detector and timer control circuit further comprising a switching diode, resistor and capacitor networks and an OP-AMP wherein said OP-AMP receives a DC voltage from the diode and resistor and capacitor networks and responds to the input by sending a positive DC voltage to power and operate the timer control circuit and the output control circuit.

3. An automatic turn signal monitor and warning device according to claim 2 wherein said timer with brake reset circuit further comprises:
   a 555 timer 8 pin dip chip, potentiometer, two fixed resistors, three capacitors controlling the delay period and an NPN bi-polar transistor to reset the timer in response to input voltage from the pulse detector and timer control circuit and a reset signal from the sensor circuit and providing output to the output control circuit.

4. An automatic turn signal monitor and warning device according to claim 3 wherein said output control circuit further comprises:
   a quad NAND gate, a potentiometer, and two resistors receiving a pulse from the pulse detector and timer control circuit, a pulse from the signal sensor circuit and DC from the timer with the output control providing the drive pulse output to the power amplifier circuit.

5. An automatic turn signal monitor and warning device according to claim 4 wherein said power amplifier circuit further comprises:

a MOS FET power transistor with its source connected to ground and its drain connected to the transducer circuit to convert voltage pulse on the gate to pulsed current to drive the transducer.

6. An automatic turn signal monitor and warning device according to claim 5 wherein the transducer circuit further comprises:
a device for converting voltage to a visually, tactilely or auditory perceivable indicator.

7. An automatic turn signal monitor and warning device according to claim 6 wherein all component circuits of the device are electrically isolated to prevent interference with or damage to the electrical circuitry of the vehicle's turn signals and brakes and are impervious to hazard light operation of the vehicle.

* * * * *